United States Patent [19]
Fujii

[11] Patent Number: 4,636,058
[45] Date of Patent: Jan. 13, 1987

[54] EXPOSURE OPTICAL APPARATUS

[75] Inventor: Yozo Fujii, Hachioji, Japan

[73] Assignee: Konishiroku Photo Industry Co., Ltd., Tokyo, Japan

[21] Appl. No.: 614,817

[22] Filed: May 29, 1984

[30] Foreign Application Priority Data

Jul. 21, 1983 [JP] Japan .................. 58-133373
Jul. 21, 1983 [JP] Japan .................. 58-133374

[51] Int. Cl.$^4$ .................. G03G 15/04; G03G 15/28
[52] U.S. Cl. .................. 355/8; 355/3 R
[58] Field of Search .................. 355/3 R, 8, 11, 66

[56] References Cited

U.S. PATENT DOCUMENTS

| | | | |
|---|---|---|---|
| 3,062,109 | 11/1962 | Mayo et al. | 355/8 |
| 3,554,640 | 1/1971 | Hoskins | 355/8 |
| 4,077,714 | 3/1978 | Komori et al. | 355/8 X |
| 4,158,499 | 6/1979 | Hattori et al. | 355/8 |

Primary Examiner—Fred L. Braun
Attorney, Agent, or Firm—James E. Nilles

[57] ABSTRACT

An exposure optical apparatus with two sets of wire pulleys disposed on both sides of a carriage for optical scanning of a document, the wire pulleys working for drive and control of the carriage, wherein two sets of fixed pulleys are provided on an apparatus fixed zone and laid on corresponding ends of the wire pulleys to a common wire, and a stopper member for determining an initial position of the carriage is provided on the apparatus fixed zone, thereby setting an initial posture of the carriage. The wires of both the wire pulleys are constituted of a common single wire, two sets of moving pulleys are provided on both sides of the document board carriage, and the wires are laid symmetrically on an axis of the center of the direction in which the document board carriage moves.

12 Claims, 11 Drawing Figures

EXPOSURE OPTICAL APPARATUS

BACKGROUND OF THE INVENTION

1. Field of the Invention:

This invention relates to an exposure optical apparatus such as, for example, electrophotographic copying machine and the like, and is particularly concerned with improvement of a drive controlling means of the exposure optical apparatus.

2. Description of the Prior Art:

As is known generally, an exposure optical apparatus used on an electrophotographic copying machine has a document board moving type and a mirror carriage moving type, however, both the types have carriages driven and controlled generally on a wire pulley.

In such exposure optical apparatus as is controlled on the wire pulley, that of structure in which a carriage is controlled on two sets of wire pulleys disposed on both sides of a direction in which the carriage moves has been employed popularly of late in order to attain miniaturization and lightweight structure of the apparatus. FIG. 1 represents a conventional mirror carriage moving type exposure optical apparatus for which two sets of wire pulleys are employed, wherein a mirror carriage 3 with a first mirror 1 and an exposure lamp 2 mounted thereon and a half-speed carriage 6 with second and third mirrors 4, 5 mounted thereon are placed on rails 8A, 8B laid on both sides of a frame 7. The mirror carriage 3 and the half-speed carriage 6 are driven and controlled by two sets of wire pulleys 9A, 9B disposed on both sides of the direction rectangular to that in which the two carriages move. The wire pulleys 9A, 9B are provided with wires A, B with both ends connected to a stay on a fixed zone of the apparatus, the wires A, B being laid on driving pulleys 10, 11 of the half-speed carriage 6, moving end pulleys 12, 13 and a driving drum 14, coupled to both sides of the mirror carriage 3, thus reciprocating the mirror carriage 3 and the half-speed carriage 6 according to a rotating direction of the driving drum 14.

Accordingly, in such configuration of the wire pulleys 9A, 9B, not only directions in which the wires A, B are strained but also initial tensions of both the wires A, B relating to stretch thereof should be equalized to keep a parallelism among the mirrors 1, 4, 5 constant at all times and also to keep angles of the mirrors correct to a moving direction X at an arbitrary moved position.

In amplifying on a problem of initial tensions of both the wires A, B, assuming the wires A, B are strained in parallel with each other, then an influence due to initial tensions $t_a$, $t_b$ of both the wires will be understood from obtaining both side positions of the mirror carriage 3 in case the mirror carriage 3 is drawn on a force F by both driving drums 14, 14. Let initial lengths of the wires A, B from the driving drums 14, 14 to the mirror carriage 3 be $l_a$, $l_b$, and a spring constant of both the wires A, B be R, then lengths $L_a$, $L_b$ of both the wires A, B after deformation of the concerned part will be given:

$$L_a = l_a + (F - t_a)/R$$

$$L_b = l_b + (F - t_b)/R$$

Here, $l_a = l_b$ under the state wherein the exposure optical apparatus has been framed and adjusted accordingly, therefore a condition for the mirror carriage 3 to move as keeping an initial parallelism of the mirror carriage 3 with the moving direction should be:

$$L_a = L_b$$

namely, $$(F - t_a)/R = (F - t_b)/R \tag{1}$$

As will be understood from Eq. 1, the initial tensions $t_a$, $t_b$ of both the wires A, B must be set equally for keeping parallelism of the mirror carriage 3 which may exert a big influence on multiplication factor and focusing constant at all times.

The initial tensions $t_a$, $t_b$ of the left and right wires A, B are therefore set equally hitherto by means of a spring balancer when the wires A, B are connected or by incorporating a tension roller 16 using a spring 15 controlled as illustrated midway of a route of the wires A, B. However, such means for adjsutment has a limit itself due not only to a solid difference between the wires A, B but also to a measuring precision of the spring balancer and a solid difference of the tension roller 16, thus involving a complicatedness and a long time for the adjusting work.

SUMMARY OF THE INVENTION

In view seriously of the problem prevailing on a conventional exposure optical apparatus, an object of this invention is to provide such structure as will equalize simply wire initial tensions of two sets of wire pulleys on both sides of a carriage. Another object of this invention is to provide an exposure optical apparatus with two sets of wire pulleys positioned on both sides of a carriage for optical scanning of a document, the wire pulleys operating for drive and control of the carriage, wherein two sets of fixed pulleys are provided on an apparatus fixed zone to have a common wire laid on corresponding ends of the wire pulleys, and a stopper member for giving a carriage initial position is provided on the apparatus fixed zone to set an initial posture of the carriage.

Further object of this invention is to provide the above-mentioned exposure optical apparatus, wherein wires of both the wire pulleys are constituted of a common single wire, two sets of moving pulleys are provided on both sides of a document board carriage, and the wire is laid symmetrically on an axis taken at the center of a direction in which the document board carriage moves.

Still another object of this invention is to provide such an optical system driving unit capable of coordinating simply initial tensions of wires on both sides at the time of assembly, keeping an optical parallelism of a dynamic mirror supporting member, and further capable of coordinating the wire initial tensions simply in a short time even in case readjustment becomes necessary for the increased number of times of reciprocating motions of the optical system.

Further object of this invention is to provide an optical system driving unit wherein both sides of a plurality of optical systems are moved on a frame by means of a wire member, which is characterized in that the wire member provided on both the sides is framed solidly and fixed on the frame at one spot.

Other objects and features of this invention will be clarified in accordance with the following description of drawings.

DESCRIPTION OF THE PREFERRED EMBODIMENTS

Embodiments of this invention will now be described in detail with reference to FIG. 2 and FIG. 3.

Figure 1:
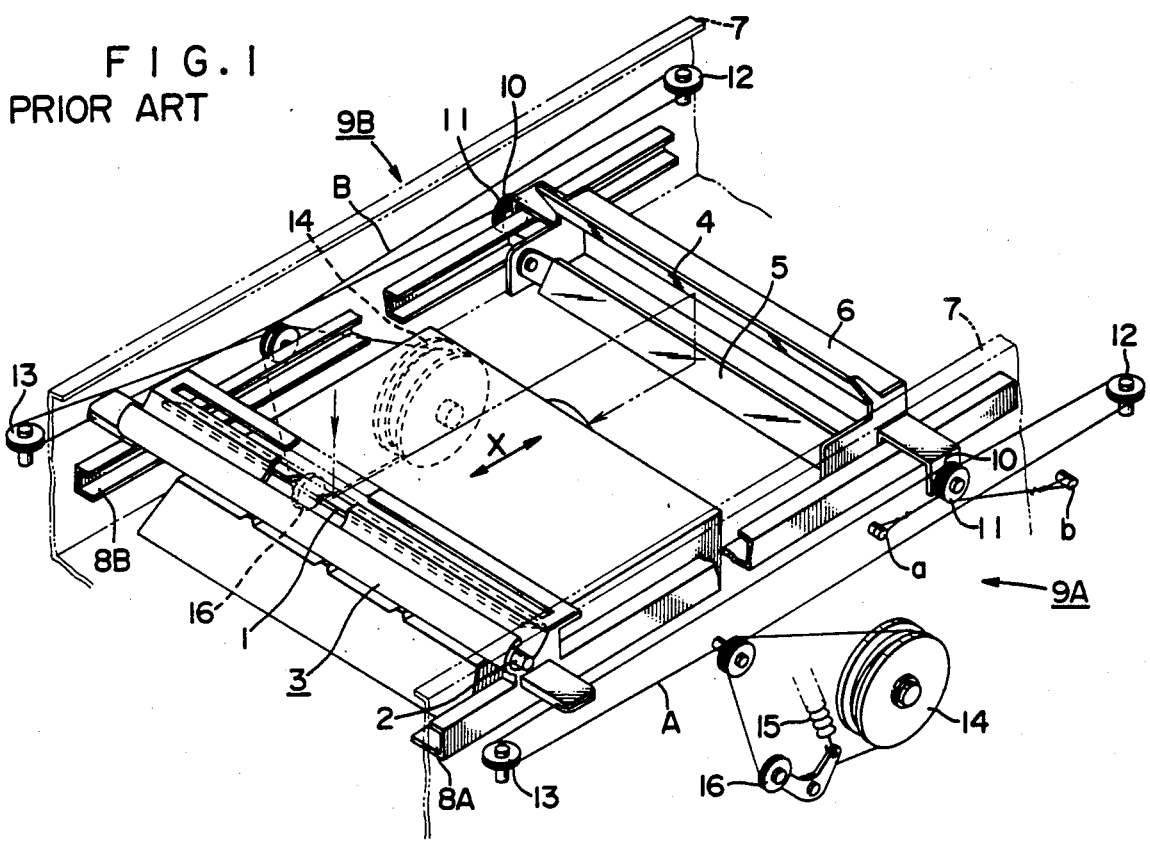
FIG. 1 is a perspective view of a conventional exposure optical apparatus.
Figure 2:
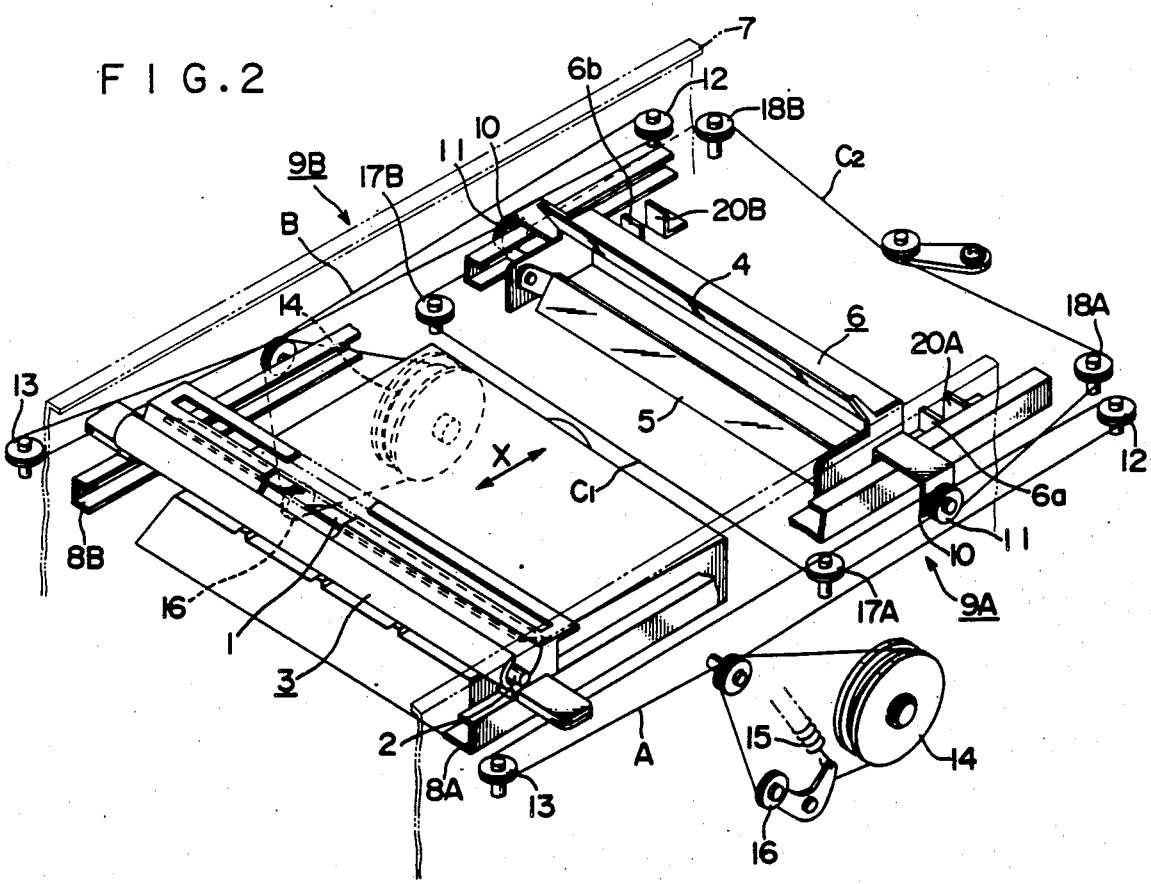
FIG. 2 is a perspective view of an exposure optical apparatus according to this invention.
Figure 3:
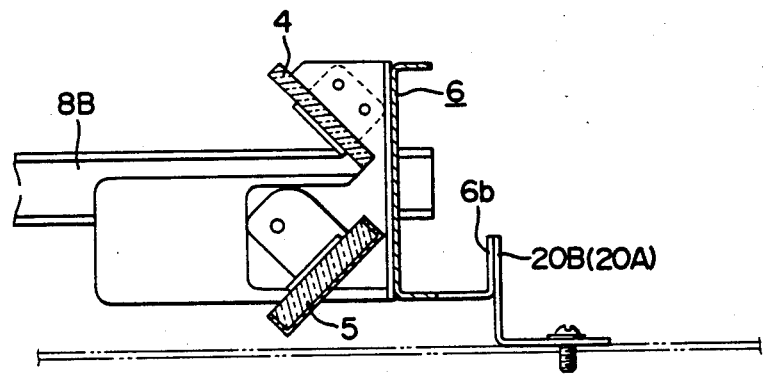
FIG. 3 is a sectional view of a half-speed carriage kept at an initial position.

FIG. 2 is a perspective view of an exposure optical apparatus according to this invention which corresponds to that of FIG. 1, and like reference characters denote like structural parts in FIG. 1. As will be apparent from a comparison with FIG. 1 one of the features of this invention is that in which wires A, B of the wire pulleys 9A, 9B are made common to work, stays a, b of FIG. 1 are omitted, fixed pulleys 17A, 17B and 18A, 18B opposite to a cross direction of the half-speed carriage 6 are positioned instead, and both ends of the wires A, B are laid between the pulleys to adaptable common parts $C_1$, $C_2$. Then at an initial position, both sides 6a, 6b of the half-speed carriage 6 come in contact lightly with stoppers 20A, 20B fixed on the frame of the apparatus as shown in FIG. 3. The half-speed carriage 6 has therefore its posture corrected whenever it returns to the initial position even from repeating the reciprocating motion, thus moving in the same posture at all times.

Then, the illustrated embodiment represents a case where the stoppers 20A, 20B are provided on the main body part of the apparatus, however, it can be provided on the mirror carriage to adjust the degree of parallel of the mirror carriage 3 with the halfspeed carriage 6 at the initial stage.

Figure 4:
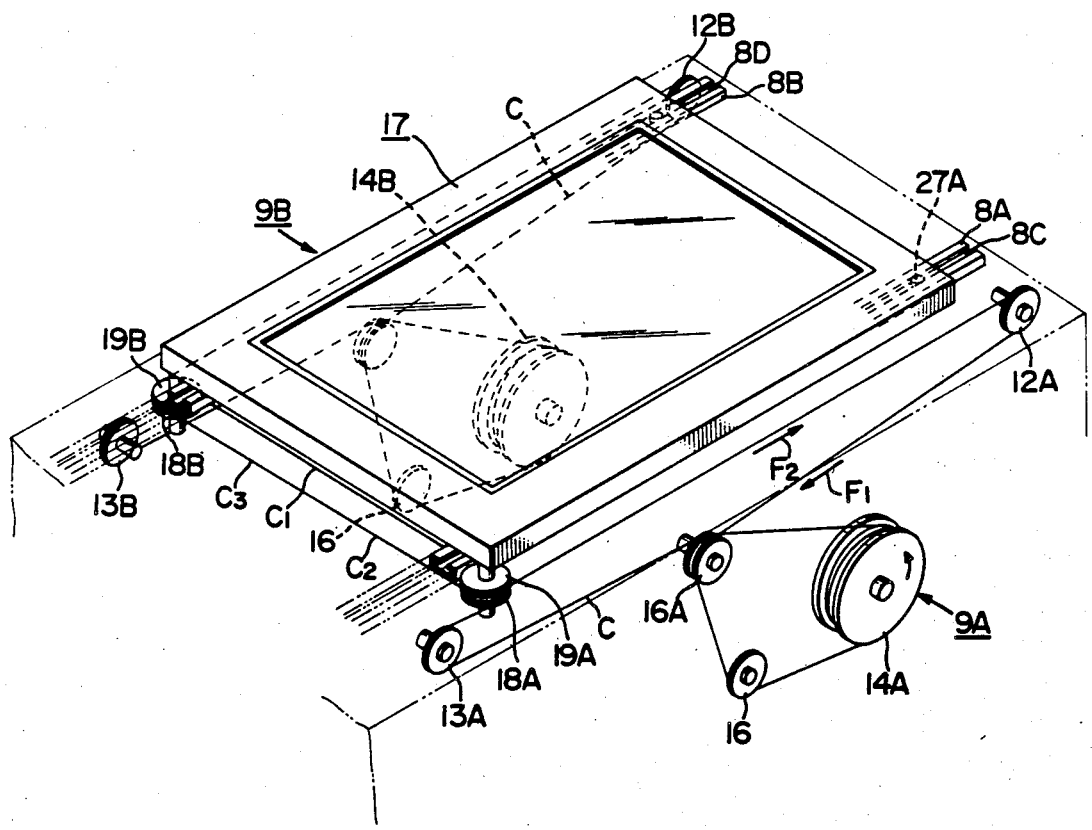
FIG. 4 is a perspective view of an exposure optical apparatus given in another embodiment of this invention.

In another embodiment of this invention as shown in FIG. 4, two sets of moving pulleys 18A, 18B and 19A, 19B sharing a wire C laid on moving end pulleys 12A, 12B, 13A, 13B and driving drums 14A, 14B of the left and right wire pulleys 9A, 9B are provided on a document board carriage 17 left and right of the front end through tension roller 16 and fixed pulley 16A. Then, a center of the wire C laid on moving end pulleys 13A, 13B of the wire pulleys 9A, 9B is laid on the moving pulleys 18A and 18B to a common part $c_1$, and on the other hand, both ends $c_2$, $c_3$ of the wire C led from the moving end pulleys 12, 12 are laid on the moving pulleys 19A, 19B.

Figure 5:
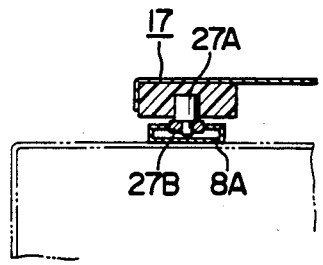
FIG. 5 is an enlarged view of a part for guiding a carriage.

As shown in FIG. 5, grooves 8C, 8D are provided on the rails 8A, 8B, and a projection 27A provided on the lower surface of the carriage 17 is fitted therein through a sliding member 27B, thereby stabilizing the movement.

A reciprocating motion of the carriage 17 will be described next.

First, as shown in FIG. 4, when the driving drum 14A rotates in the direction indicated by an arrow, the wire C is drawn as indicated by an arrow $F_1$ and then drawn as indicated by an arrow $F_2$ through the one moving end pulley 12A, therefore wires $C_2$, $C_3$ are drawn. Then the wire C returns to the driving drum 14A by way of the other moving end pulley 12B, the driving drum 14B, the moving end pulley 13B, the moving pulleys 18B, 18A and further the moving end pulley 13A and the fixed pulley 16A. When the driving drums 14A, 14B rotate in the direction indicated by the arrow, since the moving pulleys 18A, 18B, 19A, 19B are ready for rotation, driving forces by the wires from both sides are equalized and so ensured to allow the carriage 17 to move by the rate same as the migration of the wire C. After the carriage 17 moves in a predetermined distance, the driving drums 14A, 14B are revresed on a clutch (not illustrated), and thus the carriage 17 is sent backward by the wire $C_1$ at the moving pulleys 18A, 18B to return to an original position.

Figure 6:
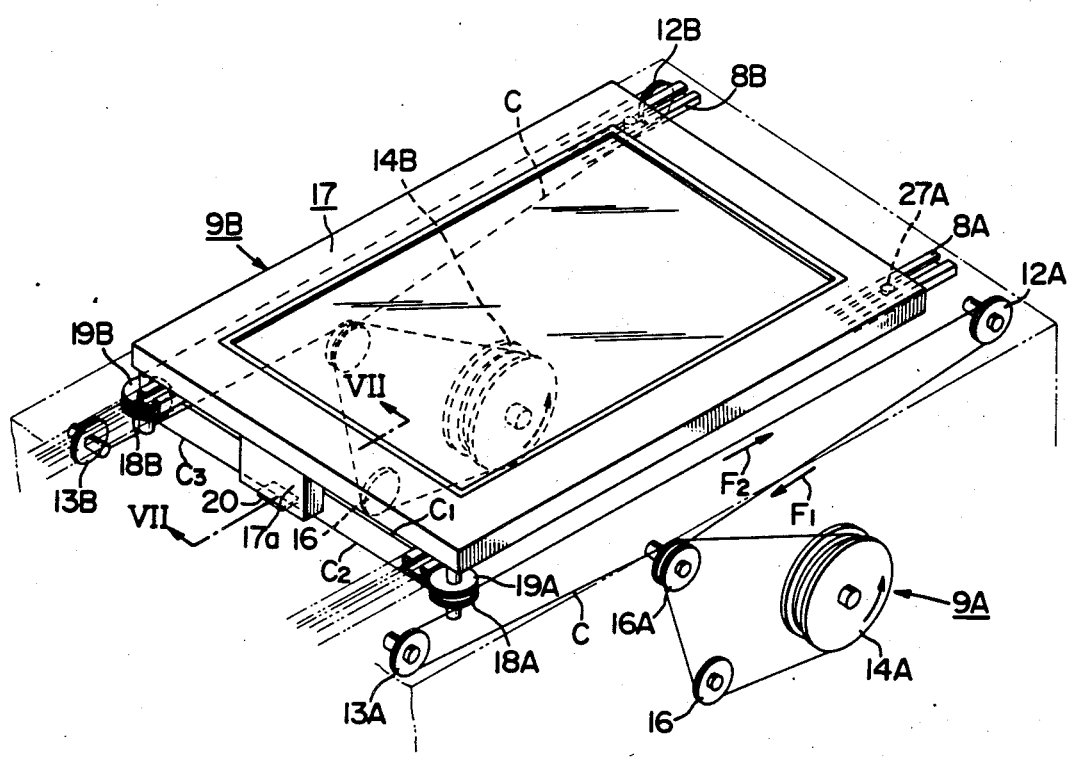
FIG. 6 is a perspective view representing other embodiments.
Figure 7:
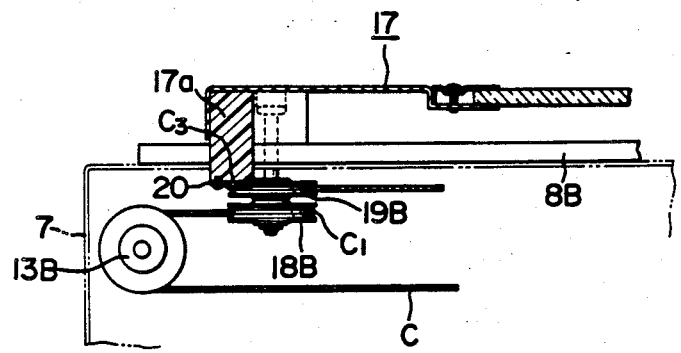
FIG. 7 is a sectional view taken along the line VII–VII of FIG. 6.

In further embodiment of this invention, if the document board carriage 17 is fixed with a mounting plate 20 at a front wall 17a near the center of the wires $C_2$, $C_3$ as shown in FIG. 6 and FIG. 7, then the document board carriage 17 is regulated on a tension of both side wires $C_2$, $C_3$, and thus a stable state is obtainable. Further in the constitution of FIG. 6 and FIG. 7, a stabler way of movement of the document board carriage 17 will be obtainable from fitting a projection 27A and sliding member 27B like FIG. 5 in either rail groove 8C or 8D.

As described above, wires of the wire pulleys 9A, 9B on both sides of the document board carriage 17 have tensions adjusted equally at all times at the common part, therefore an optical scanning superior in magnification factor and focusing will be obtainable simply through adjsuting an overall tension of the wires almost constant in an assembling process.

Figure 8:
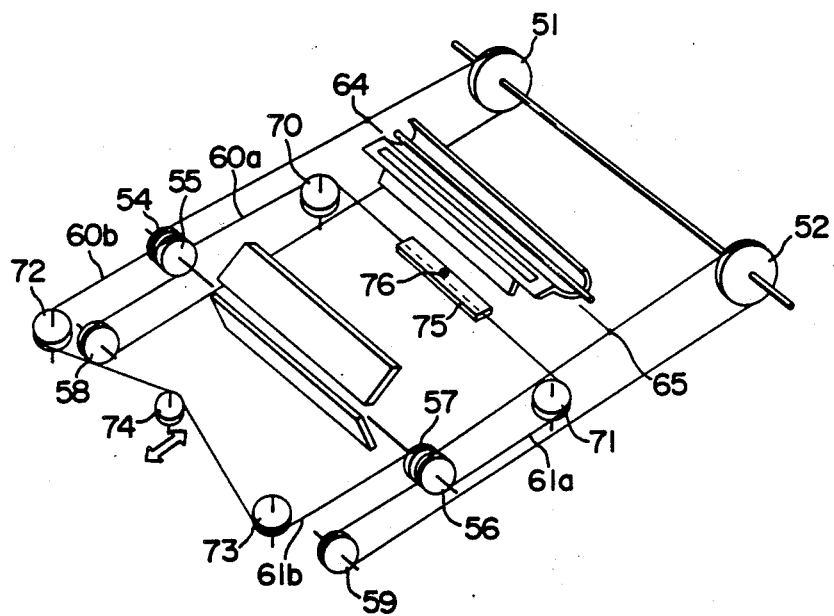
FIG. 8 illustrates a driving system given in another embodiment of this invention.
Figure 9A:
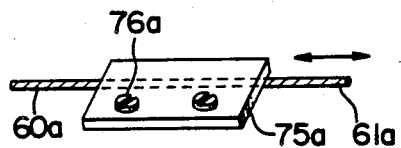
FIGS. 9(a), 9(b), 9(c) illustrate fixed members used for the invention.
Figure 9B:
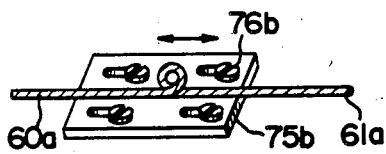
Figure 9C:
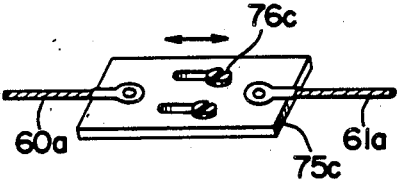

FIG. 8 represents a further embodiment of this invention. The embodiment is that for which fixed pulleys 70, 71, 72, 73, a tension adjusting pulley 74 and a fixed member 75 are added newly to the conventional one, and wires 60a, 61a are laid on the fixed pulleys 70, 71 respectively and retained by the fixed member 75 to be one piece horizontally. FIGS. 9(a) to 9(c) are main part perspective views representing the state where they are unified by the fixed member 75, wherein FIG. 9(a) represents the example shown in FIG. 8, and FIGS. 9(b) and 9(c) represent other examples.

Then wires 60b and 61b are laid on the fixed pulleys 72 and 73 likewise and then laid on the tension adjusting pulley 74 to one piece.

Since the embodiment is framed as described above, after the mirror is adjusted for parallelism and the wire is adjusted for initial tension, the fixed member 75 retains and fixes the wires 60a, 61a by tightening a machine screw 76 for clamping the fixed member 75, thus completing the adjustment. The wires 60a, 61a thus come in one piece, therefore a care will be taken not to dislocate the wires when fixing the wires by tightening the machine screw 76 after the adjustment, and then there may arise no difference totally in wire tension between both the ends.

Should the wire elongate in accordance as the number of times for repeating the reciprocating motion increases and the wire initial tension be disordered on both sides consequently, loosening once and then retightening the machine screw 76 will be effective to readjust automatically the wires 60a and 61a on both sides, thus leaving no difference in initial tension between both the ends.

The invention is not necessarily limited to the embodiment of FIG. 8, and the tension adjusting pulley 74 and the fixed member 75 can be reversed in arrangement each other. Further, the tension adjusting pulley 74 and the fixed member 75 can be provided plurally each.

As for the fixed member 75, a structure is such that the unified wires 60a, 61a are adjusted freely by loosening once and then tightening a machine screw 76a and then pushed onto a frame fixed part by a fixed member 75a in FIG. 9(a). FIG. 9(b) illustrates the case where the wires 60a, 61a are unified on a fixed member 75b, which are adjusted horizontally together with the fixed member 75b by loosening a machine screw 76b and then fixed by retightening the machine screw 76b. Further, FIG. 9(c) illustrates the case where ends of the wires 60a, 61a are fixed on a fixed member 75c, which will be adjusted in the same manner as the embodiment of FIG. 9(b). The above examples can be employed for the invention.

As will be apparent from what has been described above, according to this invention, the apparatus is constituted of a single wire as a whole with wire members for moving a plurality of moving optical systems in a predetermined range each laid on both sides, therefore the mirror optical systems will not be inclined each other by error due to an elongation of the wire, and where the optical system happens to incline due to a sliding arising with the wire, a tension adjustment of the wire will not be required even from using the optical system for correcting the inclination automatically for a long period of time, thus keeping the optical system at an accurate length of optical path at all times. Initial tensions of the wires of both side wire pulleys which will be applied on the carriage can be kept equal consequently, and thus magnification factor or focusing can be prevented effectively from going wrong due to a discrepancy in the initial tension.

According to further embodiment, furthermore, initial tensions of wires of the wire pulleys on both sides of the document board carriage can be set equally with ease, and the tension state can be so kept automatically at all times, therefore the carriage is capable of moving stably all the time, and since there occurs no inclination of the carriage, an occurrence of bending or other defect of a picture image can be prevented thoroughly, and a normal position with constant magnification factor will be obtainable.

Further, according to another embodiment of the optical system driving unit of this invention, initial tensions of the wires onboth sides can simply be coordinated, a first assembly adjustment and a readjustment after use are extremely simplified, and a parallelism of the mirrors at the initial stage and also at the time of movement can be secured to a superior effect.

What is claimed is:

1. Apparatus for scanning a document comprising:
    a frame (7);
    a carriage (3,6,17) mounted for reciprocating movement relative to said frame (7) along a center axis (x);
    two symmetrical sets (9A,9B) of pulleys disposed on opposite sides of said center axis (X);
    each set (9A,9B) of pulleys including pulleys mounted on said frame (7) and on said carriage (3,6);
    and a single endless common drive wire (C) for driving said two sets (9A,9B) of pulleys and symmetrically arranged with respect to said center axis (X) so that two symmetrical wire portions (A,B) lie on opposite sides of said center axis (X).

2. Apparatus according to claim 1 wherein said apparatus comprises two driving drums (14,14) disposed on opposite sides of said center axis (X) and drivingly connected to said two symmetrical wire portions (A,B).

3. Apparatus according to claim 1 or 2 wherein said single common endless wire (C) comprises a wire strand having two ends (60a, 61a) and a member (75a, 75b, 75c) for uniting both of said ends.

4. Apparatus according to claim 1 or 2 further comprising at least one stopper (20A, 20B) mounted on said frame (7) and engageable with said carriage (6) when the latter reaches an initial position for setting the initial posture of said carriage (6).

5. Apparatus according to claim 1 or 2 including connecting means for fixedly connecting said single endless common drive wire (C) at a point between said symmetrical wire portions (A,B) to a portion of said apparatus on said center axis (X).

6. Apparatus according to claim 5 wherein said connecting means is adjustable to maintain equal tension in said two symetrical portions (A,B) of said single common wire (C).

7. Apparatus according to claim 5 wherein said single common endless wire (C) comprises a wire strand having two ends (60a, 61a) and a member (75a, 75b, 75c) for uniting both of said ends, and wherein said connecting means includes said member 75a, 76b, 75c).

8. Apparatus for scanning a document, comprising:
    a frame (7);
    first and second carriages (3, 6) movably mounted on said frame (7) for reciprocably movement along a center axis (X) at different relative speeds, said second carriage being movable at half the speed of said first carriage;
    two symmetrical sets (9A, 9B) of pulleys symmetrically arranged on opposite sides of said center axis (X),
    each set of pulleys (9A, 9B) including pulleys mounted on said frame (7) and on said second carriage;
    and a single endless common drive wire (C) connected to said two sets (9A, 9B) of pulleys and arranged symmetrically relative to said center axis.

9. Apparatus according to claim 8 wherein said drive cable (C) comprises two symmetrical cable portions (A, B) and wherein said apparatus further comprises adjusting means (75a, 75b, 75c and 76a, 76b, 76c) to equalize the tension in said two symmetrical portions (A, B).

10. Apparatus according to claim 9 wherein said portions are united at a common point and wherein said adjusting means comprises means for fixedly but adjustably connecting said point of said drive cable to said apparatus on said center axis (X) in order to effect equalization of tension in said two symmetrical cable portions (A,B).

11. Apparatus according to claim 8 or 9 or 10 wherein said apparatus further comprises stoppers (20A, 20B) located on opposite sides of said center axis (X) and engageable with one of said carriages (6) when the latter reaches an initial position, said stoppers (20A, 20B) being mounted on one of said frame (7) and the other of said carriages (3).

12. Apparatus according to claim 11 wherein said one carriage is a document board carriage (6) and said other carriage is a mirror carriage (3), and wherein said document board carriage (6) travels at a slower speed than said mirror carriage (3).

* * * * *